United States Patent
Wang et al.

(10) Patent No.: US 9,899,827 B2
(45) Date of Patent: Feb. 20, 2018

(54) SAFETY POWER SOCKET DEVICE AND SAFETY POWER SOCKET DEVICE WITH REMOTE MONITOR MANAGEMENT

(71) Applicant: Ching-Sung Wang, New Taipei (TW)

(72) Inventors: Ching-Sung Wang, New Taipei (TW); Yi-Hong Chen, New Taipei (TW); Yu-Chiang Tu, New Taipei (TW); Yong-Siang Lin, Taipei (TW); Zhao-Yu Chen, Taipei (TW)

(73) Assignee: CHING-SUNG WANG, New Taipei (TW)

( * ) Notice: Subject to any disclaimer, the term of this patent is extended or adjusted under 35 U.S.C. 154(b) by 323 days.

(21) Appl. No.: 14/871,238

(22) Filed: Sep. 30, 2015

(65) Prior Publication Data
US 2017/0093148 A1    Mar. 30, 2017

(51) Int. Cl.
| | | |
|---|---|---|
| *H02J 3/00* | (2006.01) | |
| *H02H 5/04* | (2006.01) | |
| *H01R 13/66* | (2006.01) | |
| *H01R 13/717* | (2006.01) | |
| *H01R 27/02* | (2006.01) | |
| *H02M 7/04* | (2006.01) | |
| *F21V 23/02* | (2006.01) | |
| *F21V 23/04* | (2006.01) | |
| *H02J 7/00* | (2006.01) | |
| *F21Y 101/02* | (2006.01) | |

(52) U.S. Cl.
CPC ............ *H02H 5/04* (2013.01); *F21V 23/023* (2013.01); *F21V 23/04* (2013.01); *H01R 13/6633* (2013.01); *H01R 13/6683* (2013.01); *H01R 13/6691* (2013.01); *H01R 13/717* (2013.01); *H01R 27/02* (2013.01); *H02M 7/04* (2013.01); *F21Y 2101/02* (2013.01); *H02J 7/0052* (2013.01); *H02J 7/0063* (2013.01)

(58) Field of Classification Search
CPC ........ H02H 5/04; H01R 13/6691; H02M 7/04
USPC ......................................................... 307/26
See application file for complete search history.

(56) References Cited

U.S. PATENT DOCUMENTS

| | | | | |
|---|---|---|---|---|
| 7,227,282 B1 * | 6/2007 | Baucum, Jr. | ............ | H02J 9/062 307/150 |
| 7,622,890 B2 * | 11/2009 | Krampitz | .......... | H01M 10/4285 320/105 |
| 7,687,926 B2 * | 3/2010 | Grant | ...................... | F02B 63/04 290/1 A |
| 7,989,969 B2 * | 8/2011 | Grant | ...................... | F02B 63/04 290/1 A |

(Continued)

*Primary Examiner* — Alfonso Perez Borroto
(74) *Attorney, Agent, or Firm* — Muncy, Geissler, Olds & Lowe, P.C.

(57) ABSTRACT

A safety power socket device includes a housing having a depositing space, a power plug, a temperature sensor module, a power supply module, a transformer rectifier, a charging battery, an illumination module, and a power failure switch module. In addition of having power supply and power expansion, the safety power socket device may compare its temperature and an overhead threshold with its embedded temperature sensor module to prevent from high temperature lasting and damage resulting from electric fire by cutting off power supplying. Moreover, home safety protection is also improved by an embedded illumination module of the safety power socket device.

20 Claims, 12 Drawing Sheets

(56) References Cited

U.S. PATENT DOCUMENTS

2012/0173033 A1\* 7/2012 Tischer ..................... H02J 3/14
                                                                                            700/295

\* cited by examiner

SAFETY POWER SOCKET DEVICE AND SAFETY POWER SOCKET DEVICE WITH REMOTE MONITOR MANAGEMENT

FIELD OF THE INVENTION

The present invention relates to a power socket, particularly relates to a safety power socket of high temperature protection and a safety power socket with remote monitor management.

BACKGROUND OF THE INVENTION

Fire accident resulting from electric fire has been usual news these years. Wire is generally enclosed by a covering made of PVC material and the high-temperature-resistant value of PVC material is higher than 105 degrees Celsius. However, the temperature of bundled wires under high current loading may raise rapidly, for example, over 150 degrees Celsius in 3 minutes to be over its high-temperature-resistant value. As a result, electric fire could happen if such a wire is continuously used for more 30 seconds.

On the other side, traditional emergency lighting lamp is usually fixedly deposited on an indoor location to be seen easily. However, once a fire or power failure happens, not only provides traditional emergency lighting lamp only surrounding where it is deposited limited emergent illumination, it is also not easily carried on to move to where needs light. In fact, traditional emergency lighting lamp has no excellent performance on emergency lighting.

Besides, present power socket of wire extension function has been one of general household necessary wares. However, both interior and exterior spaces of present power socket are poorly utilized.

Accordingly, how to avoid electric fire resulting from high temperature and provide emergency illumination during disaster with usual household wares is an important direction to develop home protection and safety.

With universal utilization of mobile telecommunication device, such as mobile phone or personal digital assistant, it is a trend to remote control home electric devices with mobile telecommunication device via internet system. Most present controlling approaches of mobile telecommunication device are to direct turn on home electric devices. Once home power load is too much and user has no idea about overloading message of home electric devices, that home electric devices are directly powered on by remote control may cause fire accident and damage.

SUMMARY OF THE INVENTION

Accordingly, one of objectives of the present invention provides a power socket of monitoring temperature which includes a temperature sensor module detecting temperatures of wires in the power socket and shuts down or powers on individual socket according to the comparison of the detected temperature and a preset safety value. Such a power socket of monitoring temperature may efficiently enhance safety on using home electric devices.

Accordingly, one of objectives of the present invention provides a power socket of monitoring current flow which includes a current detection module detecting total current of expansion sockets on the power socket and shuts down or powers on the individual socket according to the comparison of the detected total current and a rated current of the power socket.

Accordingly, a power socket of the present invention includes multitudes of sockets to be connected with various electric devices. Besides monitoring temperature function, the power socket further includes a blue tooth module and a processor. By matching of the blue tooth module, the power socket may transmit messages of the power socket to a mobile telecommunication device. Each of the sockets of the power socket may be turned on or off under control of application program in the mobile telecommunication device. The power socket of the present invention is of remote monitoring function and capable of in-time acquiring using status of the power socket to inform user to in-time manage them.

Accordingly, a safety power socket device includes: a housing having a depositing space, a power plug, a temperature sensor module, a transformer rectifier, a charging battery, an illumination module, and a power failure switch module. The power plug is deposited in the housing and configured to receive exterior alternative power. The power supply module is coupled to the power plug and configured to provide the alternative power to at least an exterior electric device. The temperature sensor module is coupled between the power plug and the power supply module, and configured to detect the temperature of the safety power socket device and compare the temperature with an overheat threshold so as to control on or off of the link between the power plug and the power supply module. The transformer rectifier is coupled to the power plug, and configured to receive the alternative power and transform the alternative power into direct power. The charging battery is coupled to the transformer rectifier and charged with the direct power from the transformer rectifier. When the charging battery discharges, the charging battery outputs a battery power. The illumination module is deposited in the housing and configured to emit light towards out of the housing. The power failure switch module is coupled to the transformer rectifier, the charging battery, and the illumination module, and configured to detect whether the power plug receives the alternative power in order to control one of links to be on, wherein one link is between the illumination module and the transformer rectifier, and the other link is between the illumination module and the charging battery.

Accordingly, a safety power socket device includes: a housing having deposition space; a power plug deposited in the housing and configured to receive alternative power from outside; a power supply module coupled to the power plug and configured to provide the alternative power to at least an exterior electric device; a current detection module coupled between the power plug and the current detection module, and configured to detect whether the alternative power from the power plug is over an overloading threshold so as to control on or off of a link between the power plug and the temperature sensor module; a transformer rectifier coupled to the power plug, and configured to receive the alternative power and transform the alternative power into direct power; a charging battery coupled to the transformer rectifier and charged with the direct power from the transformer rectifier; an illumination module deposited in the housing and configured to emit light towards out of the housing; and a power failure switch module coupled to the transformer rectifier, the charging battery, and the illumination module, and configured to detect whether the power plug receives the alternative power in order to control one of links to be on, wherein one link is between the illumination module and the transformer rectifier, and the other link is between the illumination module and the charging battery; and wherein that there is the alternative power received by the power plug is detected by the power failure switch module, the power failure switch module turns on the link between the illumination module and the transformer rectifier.

Accordingly, a safety power socket device with remote control management includes: a housing having deposition space; a power plug deposited in the housing and configured to receive alternative power from outside; a transformer rectifier coupled to the power plug, and configured to receive the alternative power and transform the alternative power into direct power; a microprocessor coupled to the transformer rectifier; a memory module coupled to the microprocessor; a blue tooth module coupled to the microprocessor; a temperature sensor module coupled between the power plug and the power supply module, and configured to detect a temperature of the safety power socket device, compare the temperature with an overheat threshold; a charging battery coupled to the transformer rectifier and charged with the direct power from the transformer rectifier; a power failure switch module coupled to the transformer rectifier and the charging battery, and configured to detect whether the power plug receives the alternative power in order to control the transformer rectifier; and a white-light illumination module coupled to the power failure switch module; wherein that there is the alternative power received by the power plug is detected by the power failure switch module, the power failure switch module turns on the link between the white-light illumination module; wherein that there is when the alternative power received by the power plug is detected by the power failure switch module, the power failure switch module turns on the link between the white-light illumination module.

Accordingly, the present invention has the advantages as following:

The housing of the power socket device is made of white transparent material to let white light penetrate from in to out to illuminate the whole power socket device. Thus, it is beautiful because none LED is to be seen from appearance.

The power socket device may detect the total current value used in the power socket device, and after monitoring and comparing, the power socket device controls the on or off of individual socket to achieve the improvement on using home electric devices.

The power socket device is equipped with an exterior temperature sensor module that would not be easily interfered by interior temperature of the power socket device. The temperature sensor module detects the temperature of a hot wire of a plug as a wire temperature. By comparing the wire temperature with a safety temperature, the power socket device may control on or off of each individual socket to achieve the improvement on using home electric devices.

The power socket device may emit alarm or switch its color light to let user know the state of the power socket device, once the power socket device detect unusual temperature or current flow of power cables.

The power socket device provides user with a screen to check power information such as date, time, temperature of power cables, or total current.

With the help of the power socket device to schedule the on and off state of an expansion power socket, user may go out without worrying about turning on or off power source.

User may clearly read power consumption of current records provided by the power socket device of the home power system with remote monitor management.

In dark environment, the home power system with remote monitor management may start lighting by pushing a button on the power socket device or operating App to make an illumination device go on.

There is no network limitation because the home power system with remote monitor management may connect to App any time by blue tooth module.

By the home power system with remote monitor management, the power socket device may be immediately monitored by App or one with the help of connection of blue tooth module if the power socket device is positioned far away.

By the home power system with remote monitor management, average current per hour of the power socket device may be recorded, and power consumption chart, power rate, and so on may be reviewed via App.

The following more detailed description of the embodiments of apparatus and methods in accordance with the present disclosure, as represented in the Figures, is not intended to limit the scope of the disclosure.

DETAILED DESCRIPTION OF THE PREFERRED EMBODIMENT

The above objects, technical features and advantages of the present invention will become more readily apparent to those ordinarily skilled in the art after reviewing the following detailed description and accompanying drawings. The presently described embodiments will be understood by reference to the drawings. For clear understanding, same elements will be marked as similar numerals.

Power sockets in the following embodiments are stilled of power supply and expansion functions. These power sockets have further advantages of efficiently utilizing interior and exterior spaces of the power sockets, providing emergent illumination and high-temperature protection, raising broad applications of the power sockets, and efficiently improving home safety protection.

Figure 1:
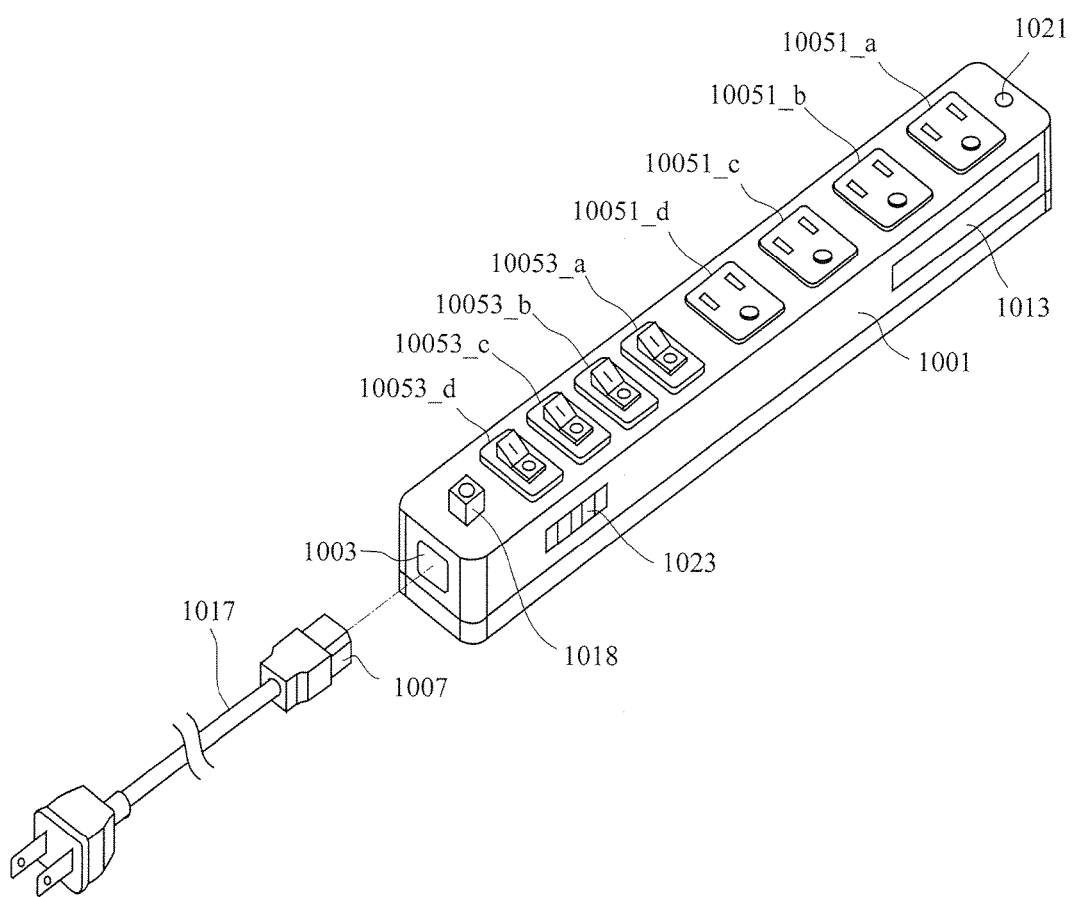
FIG. 1 is a stereo schematic diagram illustrating a safety power socket according to the present invention.
Figure 2:
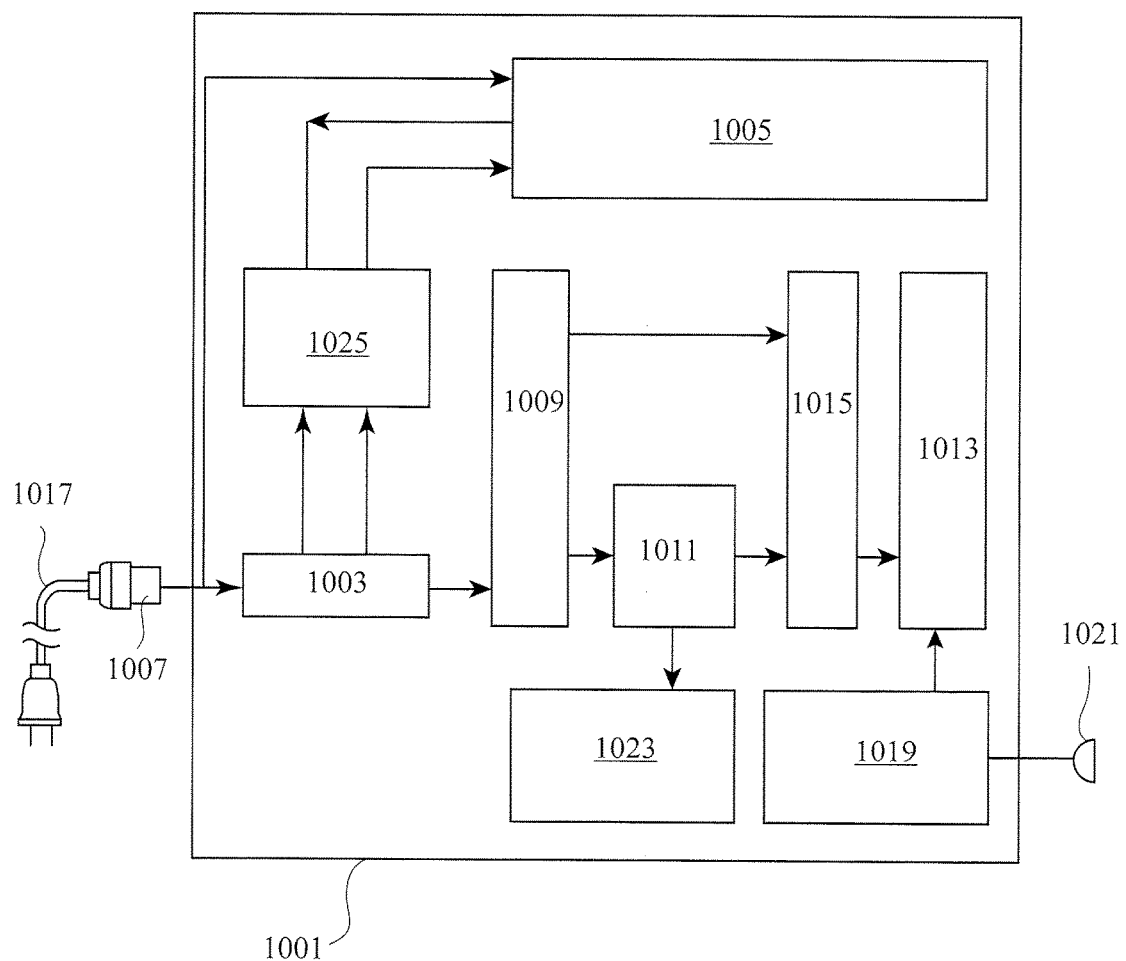
FIG. 2 is a schematic circuit block diagram illustrating a safety power socket according to the present invention.

FIG. 1 is a stereo schematic diagram illustrating a safety power socket according to the present invention. FIG. 2 is a schematic circuit block diagram illustrating a safety power socket according to the present invention. Please refer to FIG. 1, the appearance of a power socket device 10 includes a housing 1001 having deposition space, a power plug power plug 1003, a temperature sensor module 1007, a tuning knob switch 1018, multitudes of socket units 10051_a~10051_d, multitudes of socket switches 10053_a~10053_d, an illumination module 1013, a microphone 1021, and a power indicator and charging module 1023. Next, please refer to FIG. 2, the housing 1001 of the power socket device 10 includes: a power supply module 1005, a transformer rectifier 1009, a charging battery 1011, the illumination module 1013, a power failure switch module 1015, and a current detection module 1025. The power plug 1003 is deposited at one side of the housing 1001 and configured to receive exterior alternative power. The power supply module 1005 is coupled to the power plug 1003 and configured to provide the power socket device 10 with the alternative power. The temperature sensor module 1007 is coupled between the power plug 1003 and the power supply module 1005, and configured to detect temperatures of the power socket device 10. The temperature sensor module 1007 compares the temperatures of the power socket device 10 with an overheat threshold and correspondingly controls on or off of a link between the power plug 1003 and the power supply module 1005. In practice, the power plug 1003 may be consisted of some plug-in-and-out parts capable of being separated. Furthermore, the temperature sensor module 1007 is deposited at the outside of the power socket device 10 and illustrated in detail in FIG. 4A and FIG. 4B. The transformer rectifier 1009 is coupled to the power plug 1003, and configured to receive alternative power and transform the alternative power into direct power. The charging battery 1011 is coupled to the transformer rectifier 1009 and receives the direct power from the transformer rectifier 1009 for charging. When the charging battery 1011 discharges, the charging battery 1011 may output battery power. The illumination module 1013 is deposited in the housing 1001 and configured to emit light towards out of the housing 1001. The power failure switch module 1015 is coupled to the transformer rectifier 1009, the charging battery 1011 and the illumination module 1013, and configured to detect whether the power plug 1003 receives the alternative power or not, in order to control one of links to be on: one link between the illumination module 1013 and the transformer rectifier 1009; and the other link between the illumination module 1013 and the charging battery 1011. Moreover, shown as FIG. 1, the power plug 1003, the power supply module 1005, the temperature sensor module 1007, the transformer rectifier 1009, the charging battery 1011, the illumination module 1013, and the power failure switch module 1015 are deposited in the power failure switch module 1015. However, it is just one of arrangement types for illustration, and does not limit the scope of the present invention.

Please refer to FIG. 1 and FIG. 2 again, the power plug 1003 receives the exterior alternative power. In one embodiment, the power plug 1003 may be a pluggable power plug equipped with an expansion cable for power expansion. Thus, in preferred embodiments, the 10 further includes a power cable 1017. The power cable 1017 has two terminals: one terminal to receive the alternative power from wall power; and the other terminal to be coupled to the power plug 1003 for the transmission of the alternative power to the power socket device 10. It is also said that power expansion is achieved for the power socket device 10 to be coupled with the power cable 1017.

Figure 3:
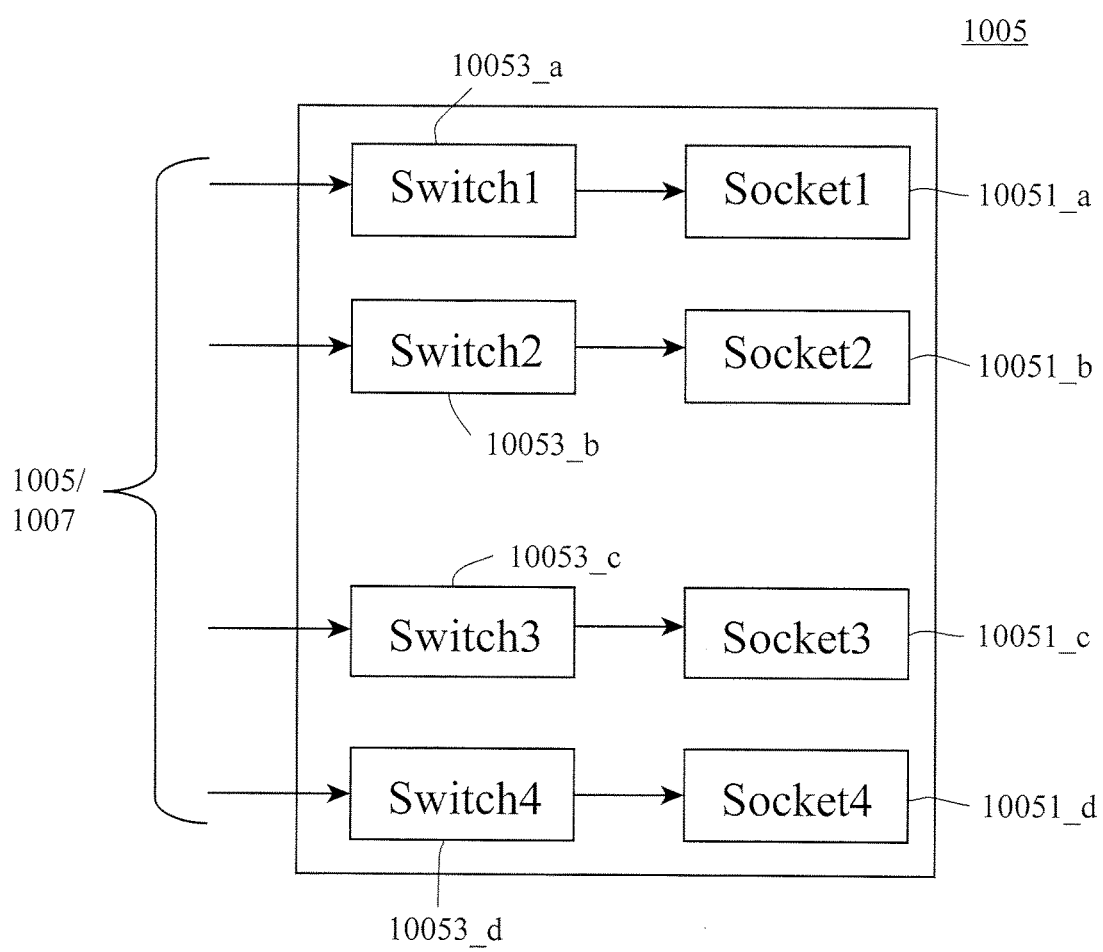
FIG. 3 is a schematic circuit block diagram illustrating a power supply module of a safety power socket according to the present invention.

The power supply module 1005 is coupled to the power plug 1003 and configured to provide the alternative power to at least one of the socket switches 10053_a~10053_d of the power socket device 10. It is also said that the power supply module 1005 is of supplying power function. FIG. 3 is a schematic circuit block diagram illustrating a power supply module of a safety power socket according to the present invention. Shown in FIG. 3, the power supply module 1005 includes some socket units 10051_a~10051_d and some socket switches 10053_a~10053_d. Taking an example of four sets of the socket units 10051_a~10051_d and the socket switches 10053_a~10053_d in the embodiment, however, it is not limited in the present invention. The socket units 10051_a~10051_d are exposed onto the housing 1001 and configured to provide the alternative power to one of coupled electric device (not shown in the figure). The socket switches 10053_a~10053_d are also exposed onto the housing 1001 and corresponded to the socket units 10051_a~10051_d, one by one respectively. The socket switches 10053_a~10053_d are coupled between the socket units 10051_a~10051_d and the temperature sensor module 1007, and corresponding to turn on or off the links between the socket units 10051_a~10051_d and the temperature sensor module 1007. It is also called that the on or off states of the socket switches 10053_a~10053_d corresponding control whether the socket units 10051_a~10051_d may supply the alternative power or not. It is noted that one of skilled in the art may design various types of the socket switches 10053_a~10053_d for real requirement or application, and they are not limited in the present invention.

Figure 4A:
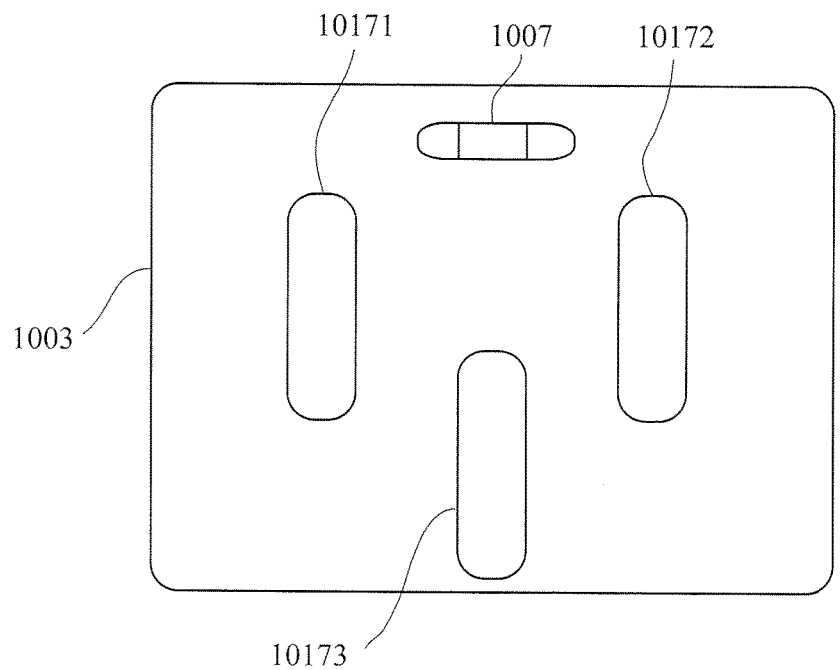
FIG. 4A is a schematic diagram illustrating a temperature sensor module of a safety power socket according to the present invention.
Figure 4B:
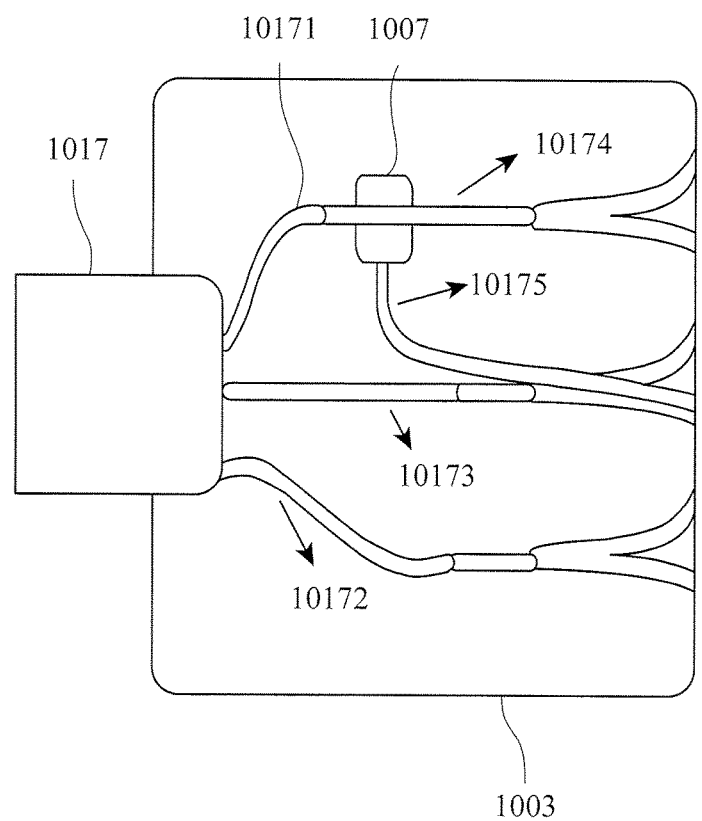
FIG. 4B is a cross-sectional schematic diagram illustrating a temperature sensor module of a power plug according to the present invention.

FIG. 4A is a schematic diagram illustrating a temperature sensor module of a safety power socket according to the present invention. FIG. 4B is a cross-sectional schematic diagram illustrating a temperature sensor module of a power plug according to the present invention. Shown in FIG. 4A, the power cable 1017 includes a hot wire 10171, a neutral wire 10172, and a ground wire 10173. The temperature sensor module 1007 has a first terminal coupled to the hot wire 10171, a second terminal coupled to the wire 10174 of a power plug power plug 1003, and the wire 10175 of a third terminal together with the ground wire 10173 coupled to the power plug 1003, as shown in FIG. 4B. It is noted that, in practice, the power plug 1003 may be consisted of some plug-in-and-out parts capable of being separated. Furthermore, the temperature sensor module 1007 is deposited at the outside of the 10. Accordingly, the temperature sensor module 1007 is coupled to the outside of the power plug 1003 and detects the temperature of one position that is on the hot wire 10171 within the plug, so that the temperature detection by the temperature sensor module 1007 may avoid being interfered by interior temperature of the power socket device 10 and enhance accuracy.

Figure 5:
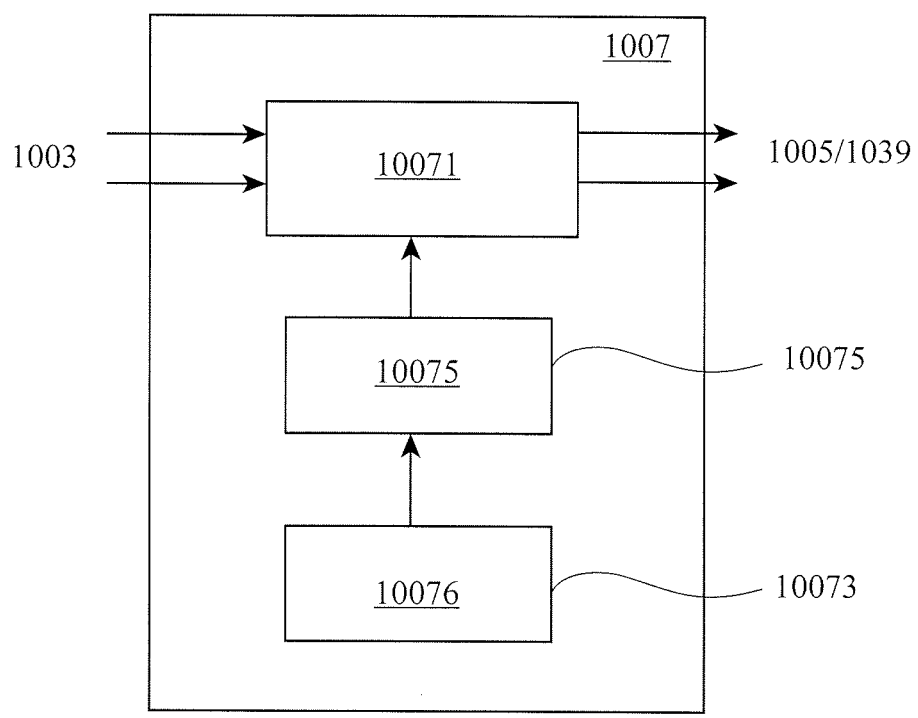
FIG. 5 is a schematic circuit block diagram illustrating a temperature sensor module of a safety power socket according to the present invention.

FIG. 5 is a schematic circuit block diagram illustrating a temperature sensor module of a safety power socket according to the present invention. Shown in FIG. 5, the temperature sensor module 1007 may includes a control circuit 10071, a temperature sensor 10073 and a comparison circuit 10075. The control circuit 10071 is coupled between the power plug 1003 and the power supply module 1005. The control circuit 10071 is controlled by controlling signal to correspondingly turn on or off one link between the power plug 1003 and the power supply module 1005. The temperature sensor 10073 detects the temperature of the hot wire 10171 on the power socket device 10. The comparison circuit 10075 is coupled between the temperature sensor 10073 and the control circuit 10071. The comparison circuit 10075 receives the temperature of the hot wire 10171 detected by the temperature sensor 10073 and compares the temperature of the hot wire 10171 with an overheat threshold. For example, the temperature sensor 10073 sets a threshold of 60 degrees Celsius so as to output the corresponding controlling signal to the control circuit 10071. It is noted that the temperature sensor module 1007 including the control circuit 10071, the temperature sensor 10073, and the comparison circuit 10075 is only an example and not used to limit the scope of the present invention. Accordingly, the temperature sensor module 1007 may determine whether overheat happens or not. Once overheat happens, the temperature sensor module 1007 may immediately close the link between the power plug 1003 and the temperature sensor module 1007, such as turning off the socket switches 10053_a~10053_d of the power supply module 1005, and further prevent exterior electric devices coupled to the socket units 10051_a~10051_d from high temperature damage by continuously supplying power and electric fire disaster. The components aforementioned are performed by hardware circuit or software plus hardware, not limited to specific methods of the temperature sensor module 1007.

Furthermore, the temperature sensor 10073 is not limited to just detect the temperature of the power socket device 10. The temperature sensor 10073 also may be a sensor to detect the temperature of interior wires in the present invention. Moreover, the value of the overheat threshold in the comparison circuit 10075 is not limited in the present invention. Accordingly, one having general knowledge in the field may design the temperature sensor 10073 and the comparison circuit 10075 for real requirements or applications. The detailed implements of the temperature sensor 10073 and the comparison circuit 10075 are not limited in the present invention.

Please refer to FIG. 1 again, the transformer rectifier 1009 is coupled to the power plug 1003, and configured to receive the alternative power and transform it into direct power. Simply said, the transformer rectifier 1009 is a device or component to transform the alternative power into the direct power, but is not limited to. On one hand, the charging battery 1011 is coupled to the transformer rectifier 1009, and configured to receive the direct power from the transformer rectifier 1009 for charging. On the other hand, when the charging battery 1011 discharges, the charging battery 1011 outputs battery power. One having general knowledge in the field may design the charging battery 1011 for real requirements or applications. The detailed implements of the charging battery 1011 are not limited in the present invention.

Next please refer to FIG. 2 again, the power failure switch module 1015 is coupled to the transformer rectifier 1009, the charging battery 1011, and the illumination module 1013. The power failure switch module 1015 detects whether the power plug receives the alternative power or not and further control one of the links to be turned on according to the detected result, and the links are the ones between the illumination module 1013 and the transformer rectifier 1009, and between the illumination module 1013 and charging battery 1011.

Figure 6:
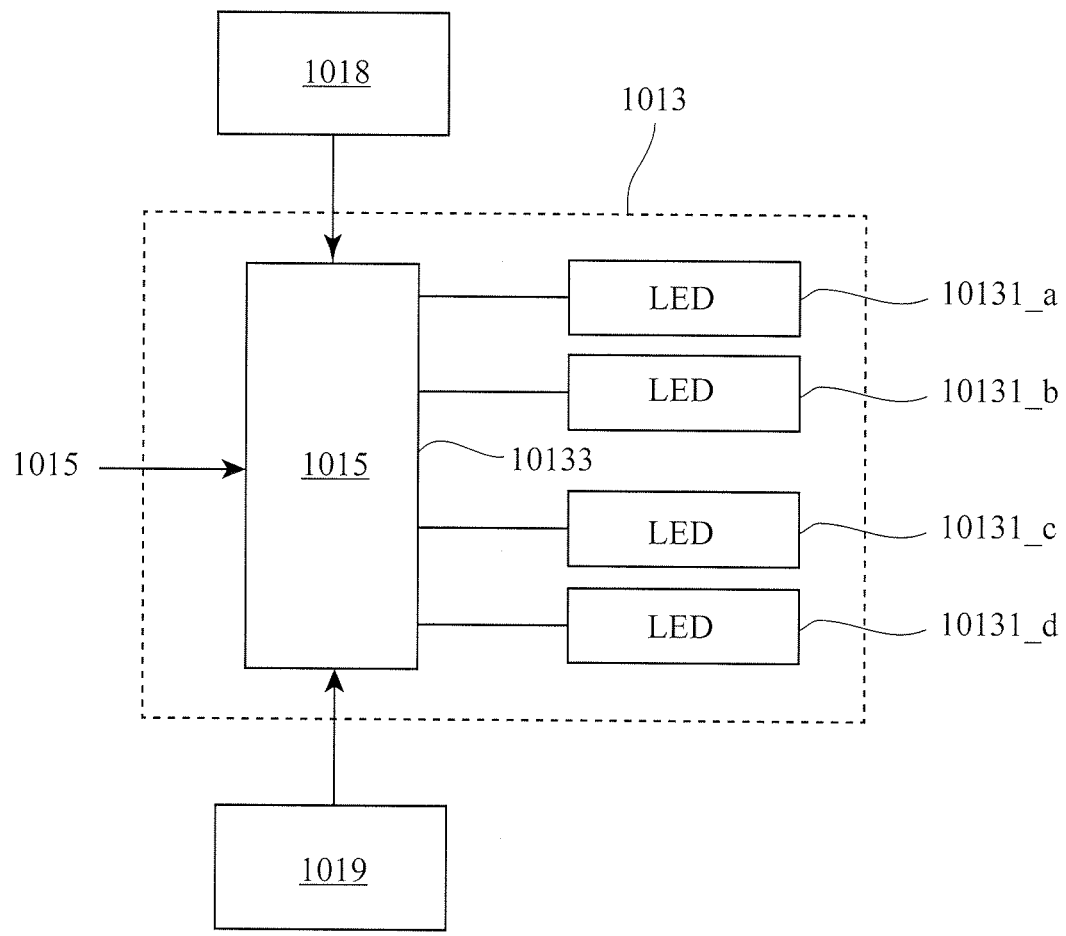
FIG. 6 is a schematic circuit block diagram illustrating an illumination module of a safety power socket according to the present invention.

FIG. 6 is a schematic circuit block diagram illustrating an illumination module of a safety power socket according to the present invention. Please refer to FIG. 1 and FIG. 6, the illumination module 1013 is deposited in the housing 1001 and configured to emit light towards out of the housing 1001. The illumination module 1013 includes some light emitting diodes (LED) 10131a~10131d and a central processing unit 10133, but not limited to in the present invention. The LEDs 10131a~10131d are exposed onto the housing 1001 and configured to emit light towards out of the housing 1001. The central processing unit 10133, such as a general central processor or a microprocessor, is coupled between the LEDs 10131a~10131d and the power failure switch module 1015. The central processing unit 10133 receives the power from one of the direct power from the power failure switch module 1015 and the battery power, and controls the LEDs 10131a~10131d to emit light towards out of the housing 1001. Simply to say, the LEDs 10131a~10131d of the illumination module 1013 are controlled by the central processing unit 10133 and received power supplied by the central processing unit 10133 via the power failure switch module 1015. Thus, provided that the power failure switch module 1015 detects there is the alternative power received by the power plug 1003, the power failure switch module 1015 turns on the link between the illumination module 1013 and the transformer rectifier 1009. Reversely, provided that the power failure switch module 1015 detects there is no alternative power received by the power plug 1003, the power failure switch module 1015 turns on the link between the illumination module 1013 and the charging battery 1011.

Accordingly, the power failure switch module 1015 is a crucial part to switch the power supplied to the illumination module 1013. In normal conditions, the alternative power received by the power socket device 10 is stable and the illumination module 1013 may acquire the direct power outputted by the transformer rectifier 1009 via the power failure switch module 1015. In case that the alternative power received by the 10 is unstable or failed, the direct power outputted by the transformer rectifier 1009 will not be enough for the use of the illumination module 1013. For this situation, the power failure switch module 1015 may switch the battery power of the charging battery 1011 to the illumination module 1013 for use. Accordingly, in emergency condition of insufficient alternative power to be supplied, the power socket device 10 of the present invention is capable of providing the illumination module 1013 necessary power via the embedded charging battery 1011, and the illumination module 1013 may continuously perform illumination function and further provide emergency illumination. Besides, the power socket device 10 is not fixed because the power plug 1003 is the one capable of being plugged in and out, so it is portable by separating the power socket device 10 from the power cable 1017 and used as the emergency illumination. One having general knowledge in the field may design the LEDs 10131a~10131d and the central processing unit 10133 for real requirements or applications. The detailed implements of the LEDs 10131a~10131d and the central processing unit 10133 are not limited in the present invention. Moreover, the lifetime of LEDs 10131a~10131d and illumination period thereof may be improved by using aluminum substrate for heat dissipation.

More detail, the power socket device 10 may further be equipped with a tuning knob switch 1018 to adjust the brightness of the light emitted from the LEDs 10131a~10131d and controlled by the central processing unit 10133. The tuning knob switch 1018 is exposed onto the housing 1001 and coupled to the central processing unit 10133. The central processing unit 10133 is in response to the tuning knob switch 1018 to control the brightness of the light emitted from the LEDs 10131a~10131d. That is, with the utilization of the tuning knob switch 1018, the brightness of the light emitted from the LEDs 10131a~10131d may be adjusted or the LEDs 10131a~10131d may be shut down.

Please refer to FIG. 1 and FIG. 6 again, the power socket device 10 further includes an acoustic control module 1019. The acoustic control module 1019 is coupled to the central processing unit 10133 and configured to drive the central processing unit 10133 via acoustic wave to control the light emitted from the LEDs 10131a~10131d. That is, without manually operating the tuning knob switch 1018, the power socket device 10 may start the central processing unit 10133 by an acoustic control way to control the light emitted from the LEDs 10131a~10131d. Shown in FIG. 1, the power socket device 10 may further be equipped with a microphone 1021 that exposes onto the housing 1001 and receives exterior sound or voice. Once wall power failure results in dark situation, by using the acoustic control module 1019, the power socket device 10 may indirectly control the illumination module 1013 to emit light. Consequently, the power socket device 10 performs broader illumination application.

Please refer to FIG. 1 again, the power socket device 10 may further include a power indicator and charging module 1023. The power indicator and charging module 1023 is coupled to the charging battery 1011 and configured to indicate residue power level of the charging battery 1011. In one embodiment, the power indicator and charging module 1023 may utilize some light emitting components or a display panel to indicate residue power level of the charging battery 1011. However, one having general knowledge in the field may design the power indicator and charging module 1023 for real requirements or applications. The detailed implements of the power indicator and charging module 1023 are not limited in the present invention.

Please refer to FIG. 1 again, the power socket device 10 further includes a current detection module 1025. The current detection module 1025 is coupled between the power plug 1003 and the temperature sensor module 1007. With detecting whether the alternative power from the power plug 1003 is over an overloading threshold, the current detection module 1025 control the on or off of the link between the power plug 1003 and the temperature sensor module 1007. That is to say, provided that the overloading alternative power from the power plug 1003 is detected by the current detection module 1025, the current detection module 1025 would cut off the transmission of the overloading alternative power from the power plug 1003 to the power supply module 1005 to prevent any exterior electric apparatus that is coupled to the power supply module 1005 from damage by the overloading alternative power. The current detection module 1025 and the temperature sensor module 1007 aforementioned are just examples for illustration and do not limit the scope of the present invention. For example, the current detection module 1025 and the temperature sensor module 1007 may also be coupled to the illumination module 1013 and configured to control the illumination module 1013 to emit alarm light, such as driving yellow LED to emit yellow light for the overloading situation and red LED to emit read light for the overheating situation, before the overheating or the overloading situations happen. Thus, the indication of home safety protection may be achieved by such an approach.

Figure 7:
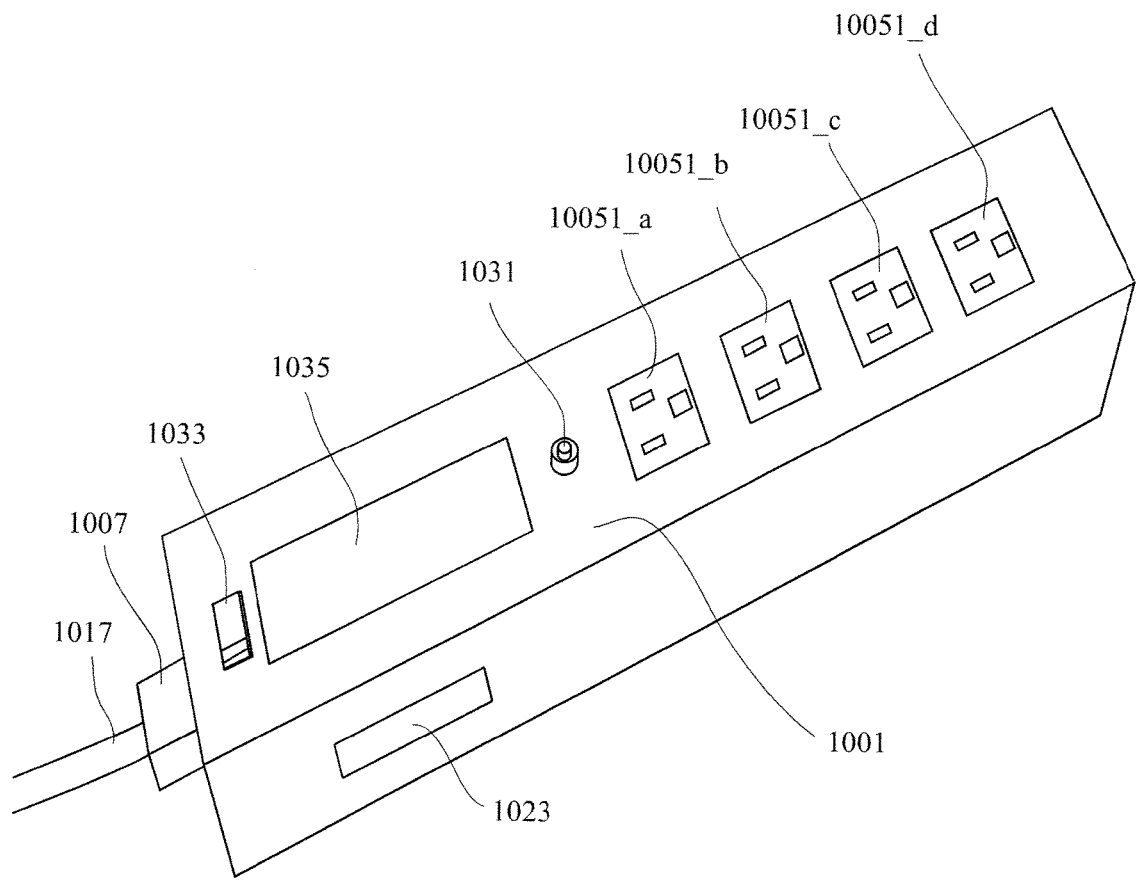
FIG. 7 is a stereo schematic diagram illustrating a safety power socket with remote monitor management according to the present invention.
Figure 8:
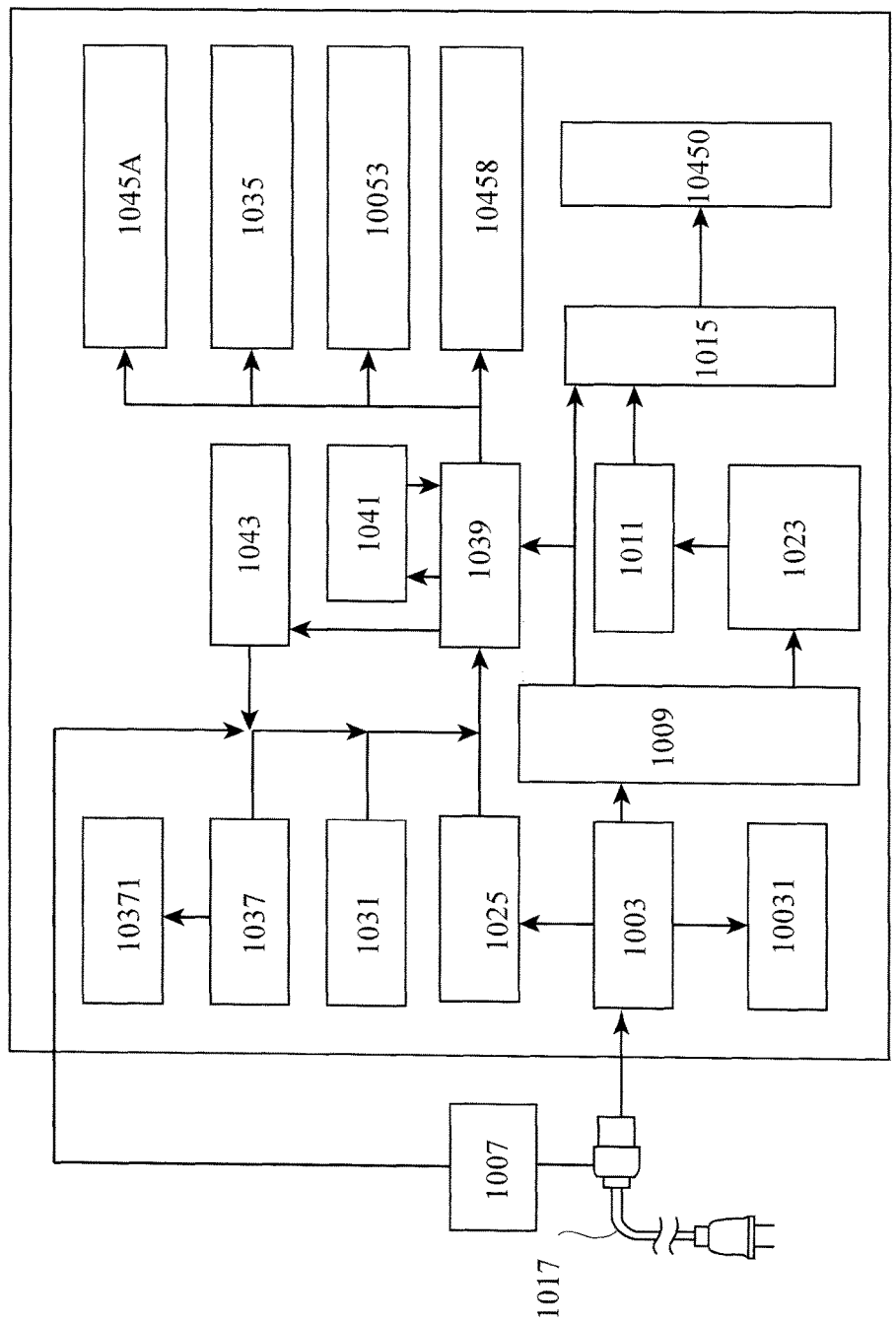
FIG. 8 is a schematic circuit block diagram illustrating a safety power socket with remote monitor management according to the present invention.

FIG. 7 is a stereo schematic diagram illustrating a safety power socket with remote monitor management according to the present invention. FIG. 8 is a schematic circuit block diagram illustrating a safety power socket with remote monitor management according to the present invention. Next, please refer to FIG. 7, in appearance, the power socket device 10 includes the housing 1001, the temperature sensor module 1007 (coupled to the 10030, the power cable 1017, the power indicator and charging module 1023, some socket units 10051_a~10051_d, a button light switch 1031, a canopy switch 1033, and a display module 1035, and so on. The display module 1035 may include a LCD or an OLED. Next, please refer to FIG. 8, the housing 1001 of the power socket device 10 includes the power plug 1003, the transformer rectifier 1009, the charging battery 1011, the power failure switch module 1015, the current detection module 1025, a time module 1037, a microprocessor 1039, a blue tooth module 1041, a memory module 1043, a yellow light alarm module 1045A, a red light alarm module 1045B, a white light alarm module 1045C, and a switch module of expansion socket 10053. The switch module of expansion socket 10053 is corresponding coupled with the socket units 10051_a~10051_d, shown on FIG. 3. Furthermore, after the matching of the blue tooth module 1041 and a user's mobile telecommunication device, signals of the power socket device 10 may be transmitted into the mobile telecommunication device, and the application program of the mobile telecommunication device may control the opening or closing of each socket of the power socket device 10.

Next, the power plug 1003 is deposited on one side of the housing 1001 and configured to receive exterior alternative power. The power plug 1003 is made of semi-transparent material to enable light penetrate through the housing 1001. The power cable 1017 is coupled to the power plug 1003 and configured to supply the alternative power to the power socket device 10. The temperature sensor module 1007 is coupled between the power plug 1003 and the microprocessor 1039. The temperature sensor module 1007 detects the temperature of the power socket device 10, compares the temperature with an overheat threshold, and controls the on or off of the switch module of expansion socket 10053 via the microprocessor 1039. The transformer rectifier 1009 is coupled to the power plug 1003 and configured to receive the alternative power and transform the alternative power into the direct power. The charging battery 1011 is coupled to the transformer rectifier 1009 and configured to receive the direct power from the transformer rectifier 1009 for charging. When the charging battery 1011 discharges, the charging battery 1011 may output battery power. The yellow light alarm module 1045A, the red light alarm module 1045B and the white-light illumination module 1045C are deposited in the housing 1001 and configured to emit light towards out of the housing 1001. The power failure switch module 1015 is coupled to the transformer rectifier 1009, the charging battery 1011, and the white light alarm module 1045C. The power failure switch module 1015 detects whether the power plug 1003 receives the alternative power, and further controls the turning-on state of one of the links: one link between the white light alarm module 1045C and the transformer rectifier 1009, and the other link between white light alarm module 1045C and the charging battery 1011. The microprocessor 1039 is coupled to the temperature sensor module 1007, the transformer rectifier 1009, the button light switch 1031, the display module 1035, the time module 1037, the blue tooth module 1041, the memory module 1043, the yellow light alarm module 1045A, the red light alarm module 1045B, and the switch module of expansion socket 10053.

Please refer to FIG. 7 and FIG. 8 again, the components same as the ones in FIG. 1 and FIG. 2 will not be repeated herein, only different parts will be illustrated. First, the coupling ways of the temperature sensor module 1007 and the power plug 1003 are shown in FIG. 4A and FIG. 4B. The temperature sensor module 1007 is configured in the power plug 1003 and connected to the hot wire 10171, the neutral wire 10172, and the ground wire 10173. Analog signal with respect to the temperature of the hot wire detected by the temperature sensor 10073 (FIG. 5) is inputted into the microprocessor 1039 and transformed into digital signal by the microprocessor 1039. The digital signal of the temperature is then outputted to the display module 1035 and transferred out by the blue tooth module 1041 after matching. Besides, provided that the temperature of the hot wire of the power cable 1017 is unusual, such as the temperature of the hot wire over 60 degrees Celsius to reach to a preset warning level, the microprocessor 1039 may automatically start the yellow light alarm module 1045A to make a yellow light flash for alarm and automatically cut off the switch module of expansion socket 10053. If the microprocessor 1039 detects that the temperature of the hot wire reaches to a dangerous level, such as the temperature of the hot wire over 80 degrees Celsius means the wire is burning hot, at the moment the microprocessor 1039 may automatically cut off the switch module of expansion socket 10053 and drive the red light alarm module 1045B to make a red light flash for alarm. Thus, automatic shut down would be achieved.

The current detection module 1025 may measure the total current loading of the switch module of expansion socket 10053 and transform the alternative current into analog signal via a current sensor. The analog signal is inputted into the microprocessor 1039, transformed into digital signal by the microprocessor 1039, shown on the display module 1035 of the housing, and immediately emitted out by the blue tooth module 1041. Similarly, if the total current loading is unusual, such as the total current loading over a rated 20 ampere, the microprocessor 1039 may automatically cut off the switch module of expansion socket 10053 and trigger the yellow light alarm module 1045A to emit the yellow light on the housing 1001 of the power socket device 10.

The power plug 1003 in the housing 1001 is coupled to a surge protection device 10031 for prevention of surge. The surge results from being struck by sudden lightning and generates noise to reduce stability of electric apparatus. Thus, it is necessary to have surge-resistant electric capacity to absorb unusual surge and filtrate noise for outputting stable voltage.

The transformer rectifier 1009 of the housing 1001 may convert international voltage (100~240 volts) into 5 volts via a transformer, transform alternative signal to direct voltage, and then convert the direct voltage into direct current of 5 volts via a filtering capacity. The direct current of 5 volts may be supplied to the charging battery 1011, each module, and the microprocessor 1039. In the power indicator and charging module 1023, the direct current of 5 volts is charged into the charging battery 1011 via charging module. Besides, one LED is alight in a charging state of the power indicator and charging module 1023, and the other LED is alight when charging of the power indicator and charging module 1023 is finished.

The charging battery 1011 is connected to the charging module 1023 and the power failure switch module 1015. The power failure switch module 1015 is configured to determine whether the alternative power is normally supplied or not. In the case of normal supplying for the alternative power, the power failure switch module 1015 may normally charge the charging battery 1011, and the white light alarm module 1045C is controlled by the microprocessor 1039 to go on or off. In the case of failure for the alternative power, the charging battery 1011 may supply power to start the white light alarm module 1045C to light up white light of the power socket device 10 as emergency illumination. Furthermore, the button light switch 1031 of the housing 1001 is coupled to the microprocessor. In the case of the alternative power supplied to the power socket device 10, white light may go on by pushing down a knob switch and go off by pushing it once more.

Next, the canopy switch 1033 controls on and off of multitudes of the switch module of expansion sockets 10053 and emergency illuminating light. When the canopy switch 1033 is in the "on" state, the white light alarm module 1045C may be driven by the charging battery 1011 of the power socket device 10 to light up as emergency illumination, or the power socket device 10 may be used as a handheld illuminator by removing power cable, even the alternative power is failed. When the canopy switch 1033 is in the "off" state, one emergency illuminating light may go off.

The time module 1037 is deposited in the housing 1001 and coupled to an independent button battery 10361. If the alternative power fails in supplying the power socket device 10, the time module 1037 is still operating and time is shown on the display module 1035.

When the application program (App) of a tablet or a mobile phone is coupled with the power socket device 10, the time of the power socket device 10 is calibrated to be same as the tablet or the mobile phone. Thus, with the App, the temperature of the power cable, total current and the state of expansion wire may be monitored immediately to switch on or off the power of the expansion socket sets and the white light alarm module 1045C of the power socket device 10. For example, when the power socket device 10 is supplied with the alternative power and the power switch is in the "on" state, under dark environment, user may utilize the App of the tablet or the mobile phone to light up the power socket device 10.

The memory module 1043 in the housing 1001 may record current flow per hour from the current detection module 1025. For example, current value per minute read out from the current detection module 1025 will be added one by one, and the total current value will be divided by 60 to acquire an average value per minute. When time is on the hour, the average value per minute is added one by one, the total average value is then divided by 60 to acquire an average current per hour, and the average current per hour may be transmitted out with the App via the blue tooth module 1041. For example, the current records of the power socket device 10 are transmitted to the App, the App may generate a chart of power consumption with respect to the current records. The chart of power consumption may include daily, weekly, monthly or yearly items. Besides, because the power socket device 10 has timing function, each one of the expansion sockets may be scheduled to be on or off at what time. Power management is achieved by switching on or off of the each socket at the scheduled time. The display module 1035 displays the temperatures of the power cable, the total current of the expansion sockets, the date, and the time, and so on. The date and time of the power socket device 10 may be calibrated aligned with the ones of the tablet or the mobile phone with the App.

Figure 9:
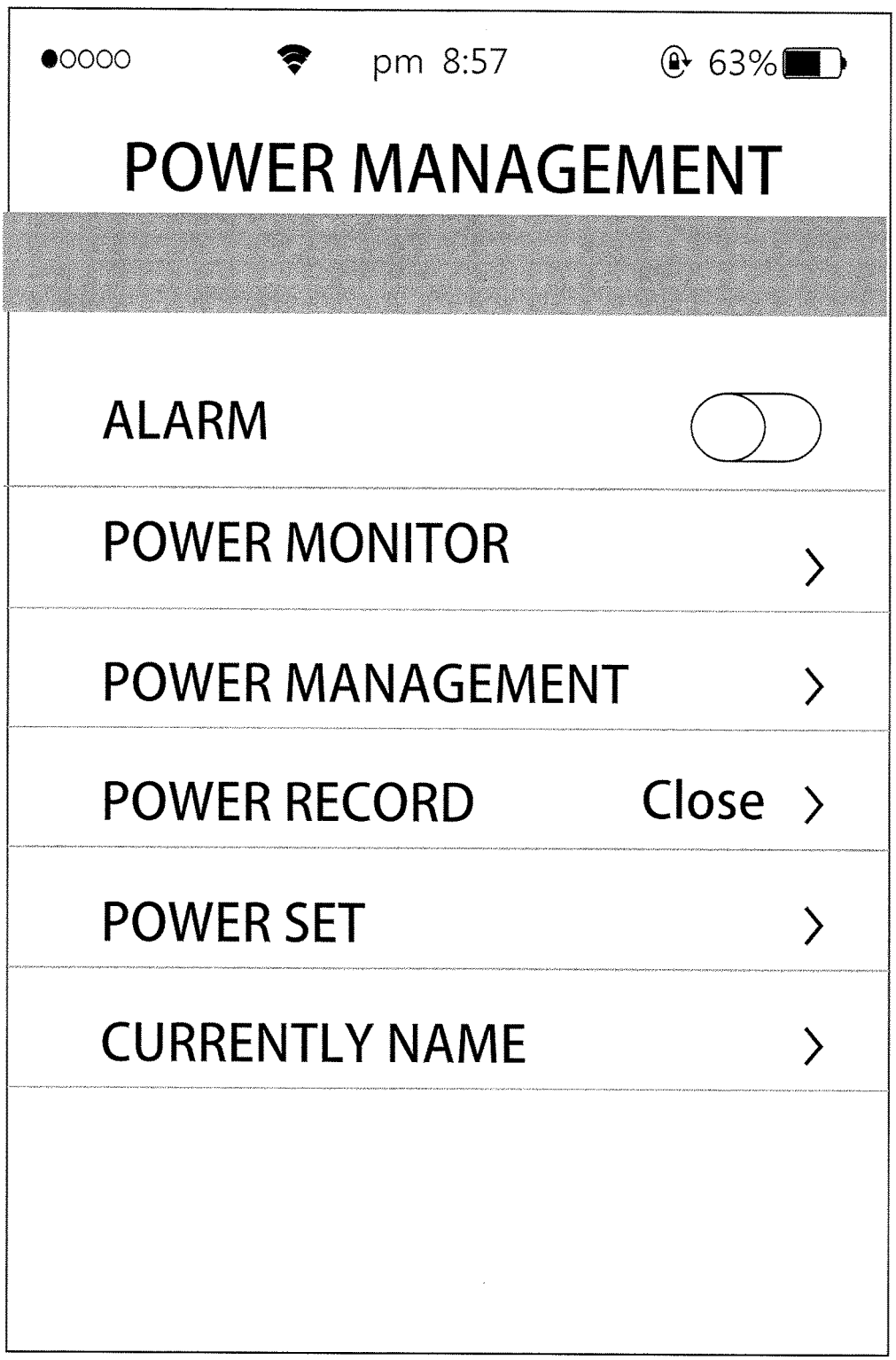
FIG. 9 is a schematic diagram illustrating a setting window of an application program displayed on a user's mobile device according to the present invention.

Accordingly, the power socket device 10 may be controlled by the App of the tablet or the mobile phone via the blue tooth module 1041, and remote control on the power socket device 10 is achieved. An alarm may be sent to notify user once the temperature or the total current of the wires of the power socket device 10 is unusual. The power socket device 10 with remote control function may be cooperated with the App to perform daily management and scheduling, for example, that which one switch of the switch module of expansion socket 10053 is driven at the scheduled time may be achieved. FIG. 9 is a schematic diagram illustrating a setting window of an application program displayed on a user's mobile device according to the present invention, and the setting window is shown on FIG. 9.

Figure 10:
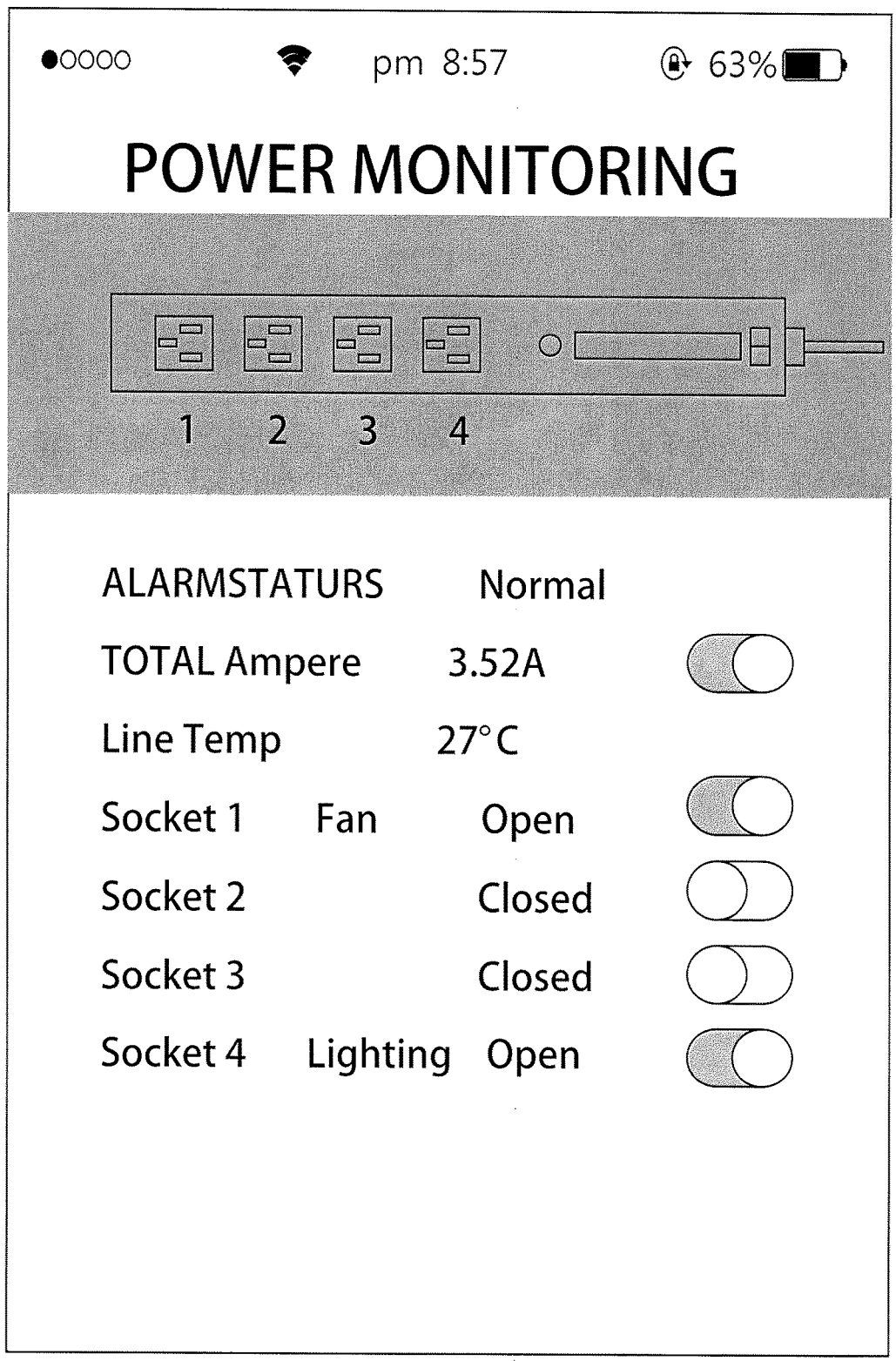
FIG. 10 is a schematic diagram illustrating a power monitor window of an application program displayed on a user's mobile device according to the present invention.
Figure 11:
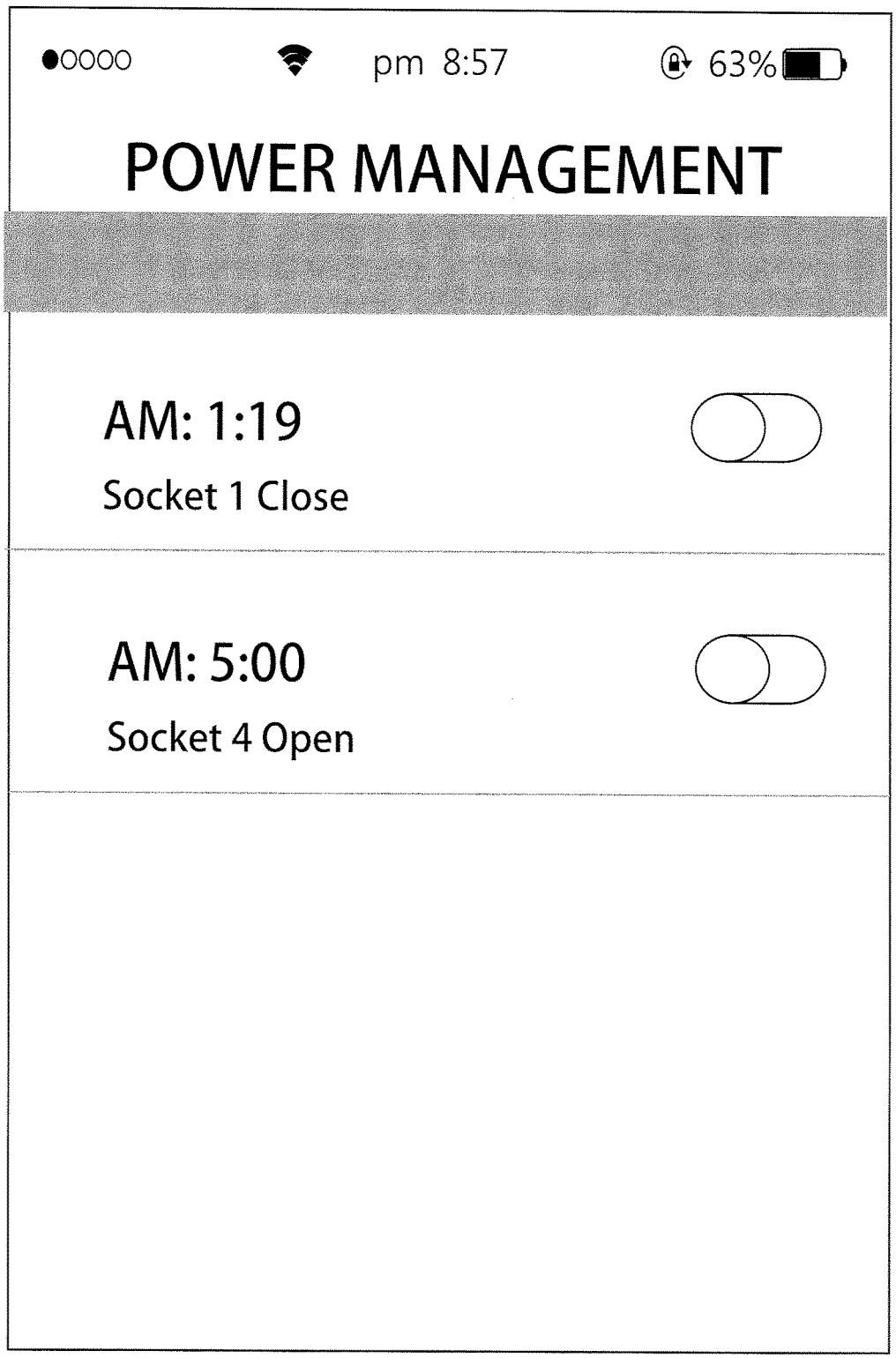
FIG. 11 is a schematic diagram illustrating a power management window of an application program displayed on a user's mobile device according to the present invention.

Next, for power monitoring, the utilization of power of the power socket device 10 may be monitored via the transmission of the blue tooth module 1041 after matched. For example, the individual switch module of expansion socket 10053 may be remotely controlled via blue tooth by the App and the situation of using the switch module of expansion socket 10053 may be monitored immediately. FIG. 10 is a schematic diagram illustrating a power monitor window of an application program displayed on a user's mobile device according to the present invention, and the App window of the mobile device for the power monitoring of the power socket device 10 is shown on FIG. 10. For power management, a power schedule of the power socket device 10 may be done via the App, such as setting time via the App interface. The power management is achieved by automatically controlling each socket to be on or off at the scheduled time. FIG. 11 is a schematic diagram illustrating a power management window of an application program displayed on a user's mobile device according to the present invention, and the App window of the mobile device for the power management of the power socket device 10 is shown on FIG. 11.

The power socket device 10 may provide a new power schedule to reset time and which one of the switch modules of expansion sockets 10053 needed to be on or off. After reset, these new settings will be transferred to the memory module 1043 for storage. When the shown time of the power socket device 10 is met with the settings in the memory module 1043, the switch module of expansion socket 10053 will be on or off according to the new settings. Furthermore, it is not necessary for the power socket device 10 to have a connection via blue tooth module 1041 after setting and execute its own schedule, because the new settings are directly written into the memory module 1043. However, if one of the switch module of expansion socket 10053 in the power socket device 10 is closed by the mobile device by the user in advance and time after closed by the user, such as one shown in FIG. 11 that the first switch module of expansion socket 10053 is set to be closed at nineteen minutes after one o'clock in the morning and the time after nineteen minutes after one o'clock in the morning, the power socket device 10 of the present invention would not automatically open the first switch module of expansion socket 10053.

Figure 12:
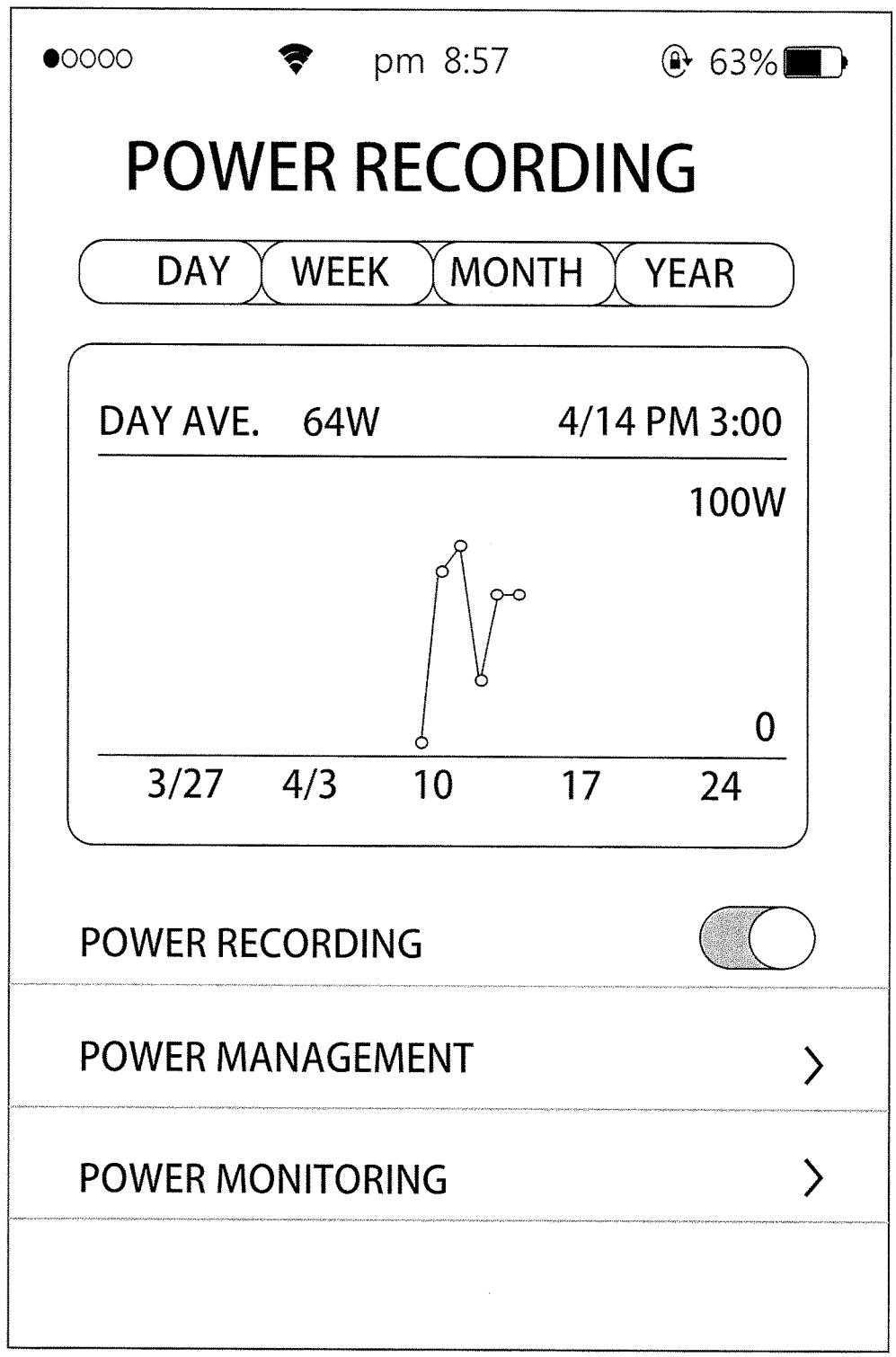
FIG. 12 is a schematic diagram illustrating a power record window of an application program displayed on a user's mobile device according to the present invention.

Lastly, the average power consumption used by the user may be recorded in the memory and transferred via blue tooth. Moreover, the App software may record power consumption each moment, integrate them to produce a daily, weekly, monthly or yearly chart, and calculate fees according to these charts to help user understand real consumption. FIG. 12 is a schematic diagram illustrating a power record window of an application program displayed on a user's mobile device according to the present invention, and software interface is shown on FIG. 12.

Accordingly, compared with a well-known power socket whose interior and exterior spaces are not sufficiently utilized, in addition to power supplying and power expansion functions, the power socket of the present invention sufficiently utilizes interior and exterior spaces, and further provides emergency illumination and high temperature protection. Consequently, the power socket of the present invention improves broad applications and home safety protection.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A safety power socket device, comprising:
   a housing having deposition space;
   a power plug deposited in the housing and configured to receive alternative power from outside;
   a power supply module coupled to the power plug and configured to provide the alternative power to at least an exterior electric device;
   a temperature sensor module coupled between the power plug and the power supply module and configured to detect a temperature of the safety power socket device, compare the temperature with an overheat threshold to correspondingly control on or off of a link between the power plug and the power supply module;
   a transformer rectifier coupled to the power plug and configured to receive the alternative power and transform the alternative power into direct power;
   a charging battery coupled to the transformer rectifier and charged with the direct power from the transformer rectifier, wherein when the charging battery discharges, the charging battery outputs a battery power;
   an illumination module deposited in the housing and configured to emit light towards out of the housing; and
   a power failure switch module coupled to the transformer rectifier, the charging battery, and the illumination module, and configured to detect whether the power plug receives the alternative power in order to control one of links to be on, wherein one link is between the illumination module and the transformer rectifier, and the other link is between the illumination module and the charging battery; and
   wherein that there is the alternative power received by the power plug is detected by the power failure switch module, the power failure switch module turns on the link between the illumination module and the transformer rectifier.

2. The safety power socket device of claim 1, wherein the temperature sensor module comprises:
   a control circuit coupled between the power plug and the power supply module, controlled by a controlling signal, and configured to correspondingly turn on or off of the link between the power plug and the power supply module;
   a temperature sensor configured to detect the temperature of the safety power socket device; and
   a comparison circuit coupled between the control circuit and the temperature sensor, receiving the temperature from the temperature sensor, and comparing the temperature with the overheat threshold to output the controlling signal.

3. The safety power socket device of claim 2, wherein the temperature sensor detects temperature of a hot wire on the safety power socket device.

4. The safety power socket device of claim 1, wherein the illumination module comprises:
 a plurality of light emitting diodes exposed onto the housing and configured to emit light towards out of the housing; and
 a central processing unit coupled to the light emitting diodes and the power failure switch module, and receiving one of the direct power and the battery power via the power failure switch module and controlling the light emitting diodes to emit the light towards out of the housing.

5. The safety power socket device of claim 4, further comprising:
 a tuning knob switch exposed onto the housing, coupled to the central processing unit, and configured to indicate the central processing unit to control the light emitting diodes to emit the light towards out of the housing.

6. The safety power socket device of claim 4, further comprising an acoustic control module coupled to the central processing unit and configured to start the central processing unit via acoustic wave to control the light emitting diodes to emit the light towards out of the housing.

7. The safety power socket device of claim 6, further comprising a microphone exposed to the housing, coupled to the acoustic control module, and configured to receive the acoustic wave from outside.

8. The safety power socket device of claim 4, further comprising a power indicator and charging module coupled to the charging battery and configured to display residue electric power of the battery power of the charging battery.

9. The safety power socket device of claim 1, further comprising a current detection module coupled between the power plug and the current detection module, configured to detect whether the alternative power from the power plug is over an overloading threshold, and control on or off of the link between the power plug and the temperature sensor module.

10. A safety power socket device, comprising:
 a housing having deposition space;
 a power plug deposited in the housing and configured to receive alternative power from outside;
 a power supply module coupled to the power plug and configured to provide the alternative power to at least an exterior electric device;
 a current detection module coupled between the power plug and the current detection module, and configured to detect whether the alternative power from the power plug is over an overloading threshold so as to control on or off of a link between the power plug and the temperature sensor module;
 a transformer rectifier coupled to the power plug, and configured to receive the alternative power and transform the alternative power into direct power;
 a charging battery coupled to the transformer rectifier and charged with the direct power from the transformer rectifier, wherein when the charging battery discharges, the charging battery outputs a battery power;
 an illumination module deposited in the housing and configured to emit light towards out of the housing; and a power failure switch module coupled to the transformer rectifier, the charging battery, and the illumination module, and configured to detect whether the power plug receives the alternative power in order to control one of links to be on, wherein one link is between the illumination module and the transformer rectifier, and the other link is between the illumination module and the charging battery; and
 wherein that there is the alternative power received by the power plug is detected by the power failure switch module, the power failure switch module turns on the link between the illumination module and the transformer rectifier.

11. The safety power socket device of claim 10, wherein the power plug is a structure capable of being plugged in and out and separable.

12. The safety power socket device of claim 10, wherein the illumination module comprises:
 a plurality of light emitting diodes exposed onto the housing and configured to emit light towards out of the housing; and
 a central processing unit coupled to the light emitting diodes and the power failure switch module, and receiving one of the direct power and the battery power via the power failure switch module and controlling the light emitting diodes to emit the light towards out of the housing.

13. A safety power socket device with remote control management, comprising:
 a housing having deposition space;
 a power plug deposited in the housing and configured to receive alternative power from outside;
 a transformer rectifier coupled to the power plug, and configured to receive the alternative power and transform the alternative power into direct power;
 a microprocessor coupled to the transformer rectifier;
 a memory module coupled to the microprocessor;
 a blue tooth module coupled to the microprocessor;
 a temperature sensor module coupled between the power plug and the power supply module, and configured to detect a temperature of the safety power socket device, compare the temperature with an overheat threshold;
 a charging battery coupled to the transformer rectifier and charged with the direct power from the transformer rectifier, wherein when the charging battery discharges, the charging battery outputs a battery power;
 a power failure switch module coupled to the transformer rectifier and the charging battery, and configured to detect whether the power plug receives the alternative power in order to control the transformer rectifier; and
 a white-light illumination module coupled to the power failure switch module;
 wherein that there is the alternative power received by the power plug is detected by the power failure switch module, the power failure switch module turns on the link between the white-light illumination module.

14. The safety power socket device with remote control management of claim 13, wherein the temperature sensor module comprises:
 a control circuit coupled between the power plug and the microprocessor, controlled by a controlling signal, and configured to correspondingly turn on or off of the link between the power plug and the power supply module;
 a temperature sensor configured to detect the temperature of the safety power socket device; and
 a comparison circuit coupled between the control circuit and the temperature sensor, receiving the temperature from the temperature sensor, and comparing the temperature with the overheat threshold to output the controlling signal.

15. The safety power socket device with remote control management of claim 14, wherein the temperature sensor detects temperature of a hot wire on the safety power socket device.

16. The safety power socket device with remote control management of claim 13, wherein the microprocessor is coupled to a yellow light alarm module and a red light alarm module, and turns on the link between the microprocessor and the yellow light alarm module or the red light alarm module, according to the controlling signal from the temperature sensor module.

17. The safety power socket device with remote control management of claim 13, further comprising a current detection module coupled between the power plug and the microprocessor, configured to detect whether the alternative power from the power plug is over an overloading threshold.

18. The safety power socket device with remote control management of claim 17, wherein the microprocessor is coupled to a yellow light alarm module and a red light alarm module, and turns on the link between the microprocessor and the yellow light alarm module or the red light alarm module, according to the controlling signal from the temperature sensor module.

19. The safety power socket device with remote control management of claim 13, wherein the power plug is coupled to a surge protection device.

20. The safety power socket device with remote control management of claim 13, further comprising a canopy switch configured to control on or off of a plurality of switch module of expansion sockets and an emergency illumination light.

* * * * *